Feb. 27, 1940.  P. MICHEL  2,191,536
MACHINE FOR FINISHING RUBBER VALVE STEMS
Filed Dec. 2, 1937  3 Sheets-Sheet 3
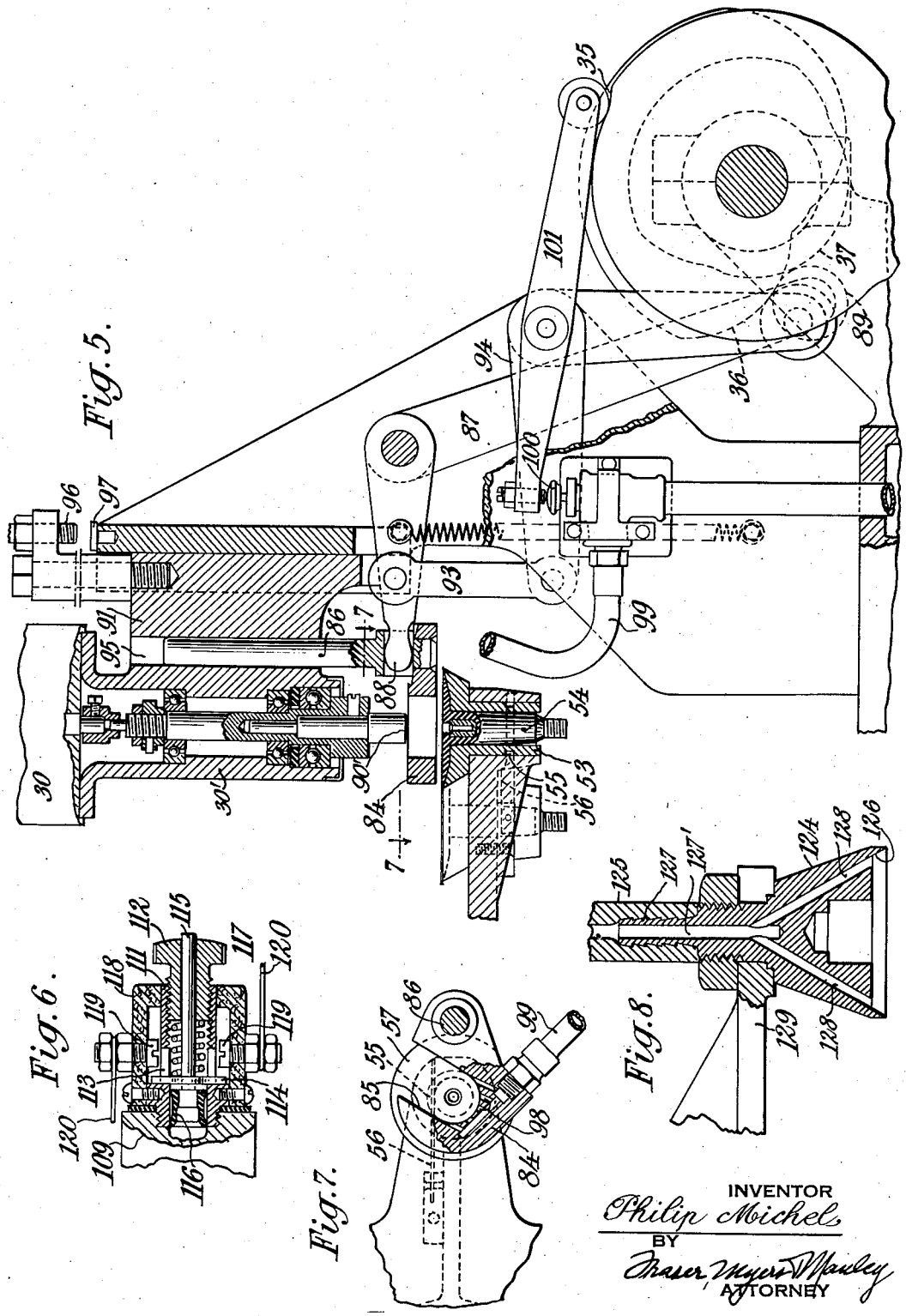
INVENTOR
Philip Michel
BY
ATTORNEY Patented Feb. 27, 1940

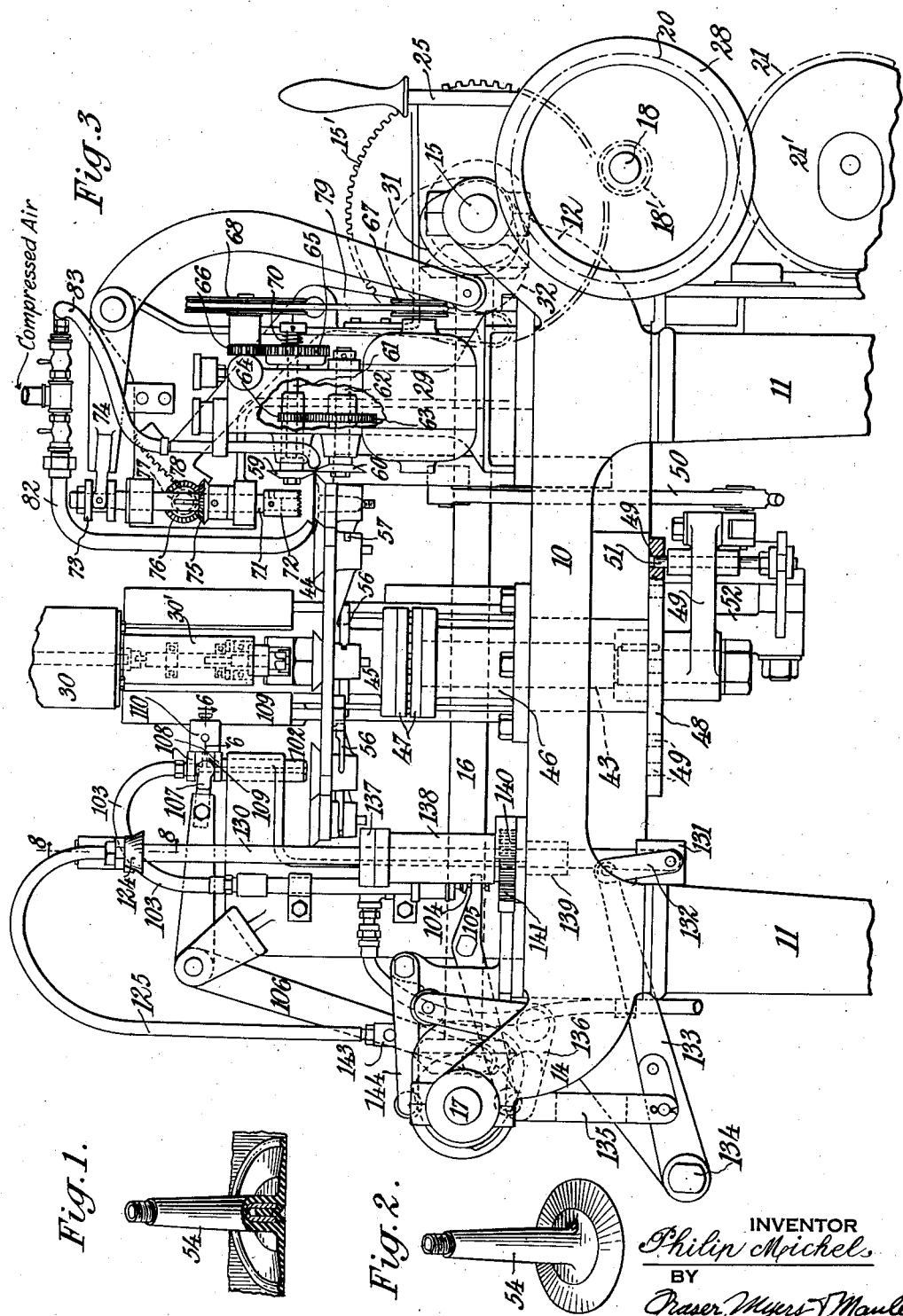

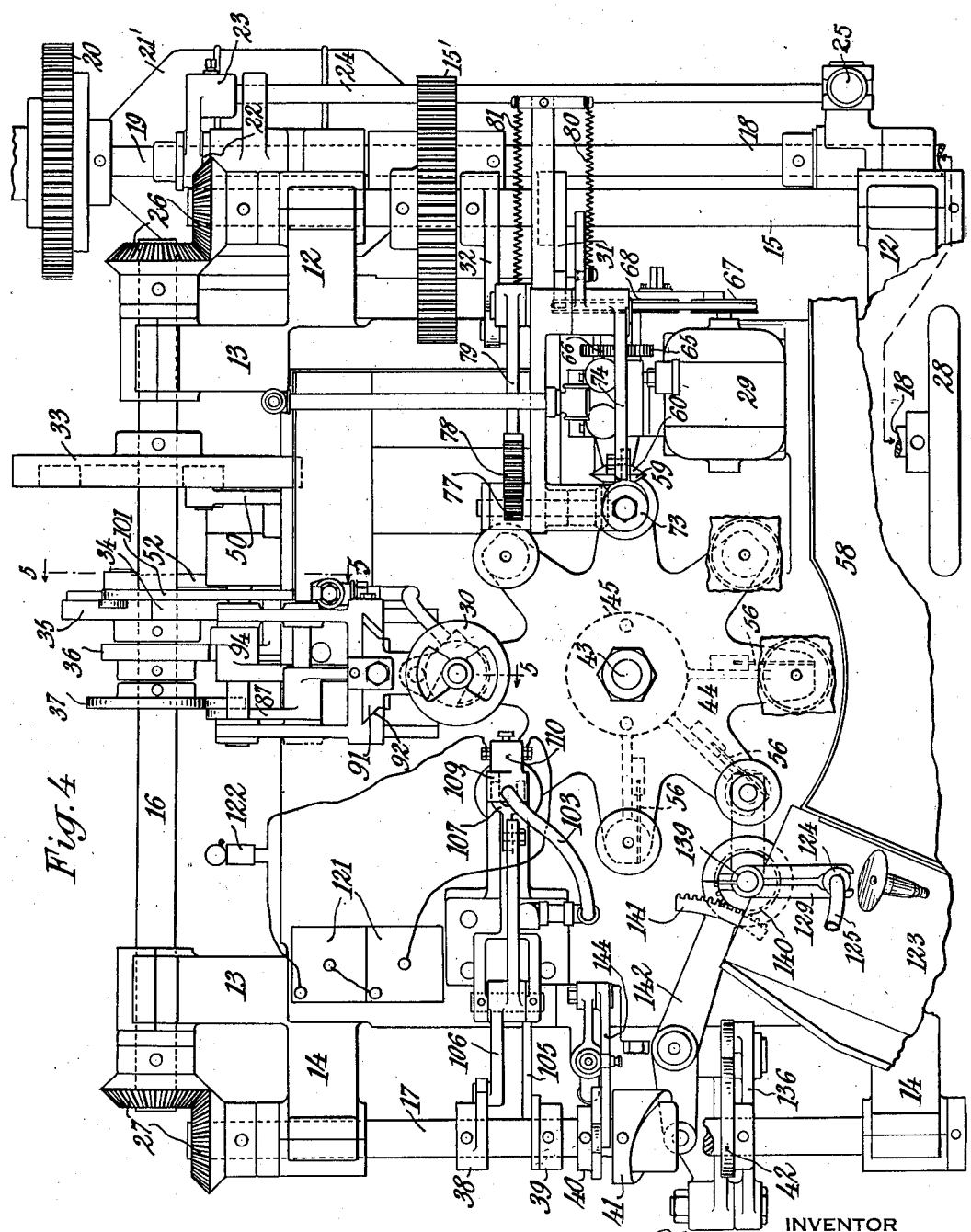

2,191,536

UNITED STATES PATENT OFFICE 2,191,536

MACHINE FOR FINISHING RUBBER VALVE STEMS

Philip Michel, Brooklyn, N. Y., assignor to Scovill Manufacturing Company, Waterbury, Conn., a corporation of Connecticut Application December 2, 1937, Serial No. 177,758

10 Claims. (Cl. 29—33)

My present invention relates to a machine for finishing and testing rubber covered valve stems.

Rubber covered valve stems as now manufactured on a large scale consist of a metallic housing or insert provided with a semi-cured-on rubber casing having an enlarged base which is usually circular and formed with a feathered edge, which base is adapted to be vulcanized directly to a pneumatic tire inner tube or other inflatable article. As manufactured, these valve stems come from the molds with surplus material around the base of the stem and frequently with rubber extending from the base into the bore of the metallic insert. To prepare these valve stems for use, the surplus material must be removed and the bore through the stem must be freed of obstruction.

According to current practice some manufacturers provide the rubber for the valve stems from a sheet and snap the base from the rubber sheet while hot, but this leaves the edge uneven and rippled, which is objectionable; others hand punch the valve bases from the sheet with a circular punch or manually cut the valves from the sheet with shears. These latter methods are slow and do not always result in the desired uniform, thin circular edge at the rubber base. With regard to the bore clearance, this is usually determined by visual inspection, and if found to be clogged with rubber, is cleaned by hand drilling on a spindle machine or the like. The trimming and the drilling, however, are time-consuming and materially add to the cost of the valves.

My present invention provides a machine for automatically performing the trimming and drilling operations in a single handling, and in addition thereto, subjects the valves to a testing operation to insure the bore clearance therethrough. In a preferred embodiment of my invention the machine consists of an intermittently movable dial having a plurality of equally spaced sockets or adapter sleeves circumferentially disposed therein, within which the valves to be acted upon can be seated either by mechanical or manual means, and a plurality of operating stations to which the dial sockets containing valves are successively presented. At the first, or trimming station, the surplus material at the valve base is cut away to leave a neat circular feathered edge; at the next, or drilling station, the bore is cleaned by a drilling operation; at the third, or testing station, the bore is tested for clearance by blowing air under pressure therethrough; and at the fourth, or discharge station, a vacuum-operated ejector mechanism picks up the valve from the dial and transfers it to a discharge chute. These various operations take place during the periods of dwell of the intermittently moving dial and insure valves of high quality at a minimum cost of finishing and testing.

The invention will be better understood from the detailed description which follows, when considered in conjunction with the accompanying drawings, wherein:

Figure 1 is a perspective view of a type of valve stem with parts broken away, as it comes from the mold, and with respect to the finishing and testing of which the present invention is concerned.

Fig. 2 is a perspective view of a valve stem after it has been acted upon by the machine of the present invention.

Fig. 3 is a front elevation, with parts broken away, of a machine embodying the present invention.

Fig. 4 is a top plan view, with parts broken away, of the machine shown in Fig. 3.

Fig. 5 is a longitudinal section taken substantially along the plane of the line 5—5 of Fig. 4, showing the operative mechanism at the drilling station of the machine.

Fig. 6 is an enlarged section taken substantially along the plane of the line 6—6 of Fig. 3, showing a signal switch assembly.

Fig. 7 is a section taken substantially along the plane of the line 7—7 of Fig. 5.

Fig. 8 is a section taken substantially along the plane of the line 8—8 of Fig. 3 showing a detail of the ejector pickup.

In order that the manner of operating the various parts of the machine which will be hereinafter described in detail may be clear, the arrangement by which the power is supplied to the various mechanisms will be first briefly described.

As shown in the various figures, the parts are either mounted upon, or supported by, a suitable table 10 carried on a plurality of legs 11. Mounted in suitable bearings 12, 13 and 14, supported by the table are operating shafts 15, 16 and 17, respectively. Rotation is communicated to the shaft 15 through a gear 15' mounted thereon by a pinion 18' mounted on a shaft 18, which latter is rotated from a stub shaft 19 which derives its power through a gear 20 mounted on said stub shaft which is in mesh with a gear 21 mounted on the shaft of an electric motor 21'. For transmitting rotation from the stub shaft 19 to the shaft 18 there is provided a suitable clutch 22 which is operated through a shifting yoke 23 carried by an operating rod 24, the latter extending to the front of the machine and being thereat provided with an operating lever 25. Rotation is transmitted from the shaft 15 to the shaft 16 through a pair of miter-gears 26, and from the shaft 16 to the shaft 17 through a pair of miter-gears 27. In order that the machine may be turned over by hand for the purpose of making adjustments therein, a hand wheel 28 is provided at the forward end of the shaft 18.

At two of its operating stations the machine is provided with independent sources of power, namely, at the trimming station, with power supplied by an electric motor 29, and at the drilling station with power derived from an electric motor 30.

For operating the variouse mechanisms at the different operating stations and for intermittently moving and indexing the dial, power is derived from the various shafts 15, 16 and 17, through the following cams, viz., cams 31 and 32 on shaft 15; cams 33, 34, 35, 36 and 37 on shaft 16; and cams 38, 39, 40, 41 and 42 on shaft 17. The functions for these cams will be presently described.

Extending vertically through the table 10 is a dial shaft 43 having fixedly mounted at the upper end thereof a dial or star wheel 44 having a depending hub 45 which is supported in spaced relation to the table 10 by a dial base 46, there being an anti-friction bearing 47 disposed between the top of the dial base and the bottom of the dial hub. The dial shaft 43 at its lower end carries an index dial 48 having circumferentially, equally spaced openings 49 corresponding in number and location with the openings in the dial or star wheel 44. The dial shaft 43 below the index plate carries a rocker arm 49 through the medium of which, together with its cooperating mechanisms, namely, lever 50, indexing pin 51, lever 52, grooved index cam 33, and index locking cam 34, function to move and index the dial or star wheel through its predetermined angle of movement in a well known manner and as is more fully described in the patent to Lewis et al., No. 1,920,265.

The dial or star wheel 44 as herein shown, has eight equally spaced radial arms, each of which adjacent its extremity is formed with a vertically disposed circular opening of a diameter to snugly accommodate a socket member or adapter sleeve 53 having an internal bore or contour of a size and shape to accommodate a definite size of tire valve stem 54. The adapter sleeve 53 has a top end flange which rests on the top of the dial when the sleeve is inserted in the opening therein (Fig. 5), and said sleeve intermediate its length is formed with an annular groove 55 for receiving a spring latch 56 which is carried by the dial and extends through a lateral groove or slot 57 formed in the lateral wall of the end of the arm of the star wheel and holds the adapter sleeve from accidental withdrawal from the opening in the star wheel but does not prevent its rotation within the arm opening.

The mechanisms at the various stations of the machine and the manner in which they function will now be described.

*Charging station.*—This is located at the front of the machine, and as herein shown, consists of a trough 58 (Fig. 4) for holding a supply of the valve stems to be acted upon, which stems are manually inserted into the adapter sleeves by an operator as the dial or star wheel is intermittently moved.

*Trimming station.*—The trimming station is located 90° distant from the charging station or two intermittent steps of the dial removed from said charging station. At this station there is located cutting means for peripherally trimming the rubber flange. These means consist of a pair of circular rotatable cutter blades 59, 60, having their plane surfaces contacting in a common plane and being rotatable in a plane disposed at an angle to the plane of the bottom of the tire valve flange, which, in the disposition of the valve in the adapter sleeve is the top surface of the flange. The cutter blades are mounted on shafts 61 and 62 which are rotated in opposite direction through gears 63, 64, mounted respectively on the shafts 61 and 62, the shaft 61, in turn, being driven through gears 65 and 66; the latter, in turn, being driven from the electric motor 29 through the pulleys 67 and 68 and driving belt 69. The face of the cutter blade 59 is held in contact with the complemental face of the cutter blade 60 by a helical spring 70 mounted on the shaft 61.

For rotating the flange of the valve stem while at the trimming station relatively to the cutters to effect the trimming operation, the following mechanisms are relied upon. Mounted at the lower end of a reciprocable shaft 71 supported in suitable bearings is a clamping bit 72, the operative end of which is roughened or toothed to engage and bite into the bottom of the rubber flange when brought into contact therewith so as to rotate the latter together with its adapter sleeve. To reciprocate the shaft 71 there is mounted at the top thereof a collar 73 which is engaged by a forked rocker arm at one end of a bell-crank lever 74, the opposite end of which carries a roller which engages the surface of the cam 31. To rotate the clamping bit there is mounted on the shaft 71 a miter-gear 75 in mesh with which a miter-gear 76 mounted on a sleeve which in turn is rotatable by a shaft which carries a pinion 77 in mesh with which is a gear sector 78 carried at one end of a bell-crank lever 79, the opposite end of which lever carries a roller which engages the surface of cam 32. To hold the rollers on the levers 74 and 79 in engagement with their respective cam surfaces, tension springs 80 and 81, respectively, are employed. To clear away or remove the trimmed off material from the valve stem base and to keep the cutter blades 59, 60, clear of such material, compressed air may be directed at suitable angles thereagainst, which air may be supplied from a compressed air reservoir through the conduits 82 and 83.

*Drilling station.*—This station is located diametrically opposite the charging station, or 90° beyond the trimming station, when measured in a counter-clockwise direction. As a valve stem carried by the dial dwells at this station, a clamping block 84 (Figs. 5 and 7) having a U-shaped opening 85 therethrough which extends beyond the center thereof and which carries an upwardly-extending guiding pin 86, is caused to move downwardly into clamping relation with the valve flange through the medium of a bell-crank lever 87, the rocker end 88 of which engages in a socket in the clamping block, and the other end of which carries a roller 89 in engagement with the cam 37. After the valve stem flange is clamped by the block 84, a twist drill 90 having a secondary cutter 90' is brought down to clear the bore in the valve stem by entering the bore of the valve housing and counterboring the rubber base. The drill is supported in a chuck carried by an extension shaft of electric motor 30 extending through a thrust bearing 30', which, in turn, is mounted on a slide-block 91 having a dovetail slide (Fig. 4) movable in a complementally formed slideway 92 formed in a suitable bearing mounted on the machine. To alternately move the drill downwardly and upwardly the slide-block is connected through a link 93 to one end of a bell-crank lever 94, the opposite end of which carries a roller movable over the surface of cam 36. The slide-block 91 is formed with a vertical opening 95 in which the guide pin 86 of the clamping block is movable, to permit of either independent or cooperative movement of the clamping block and the slide-block. For limiting the downward movement of the drill, a suitable stop means may be provided, such, for example, an adjustable screw 96 carried by the slide-block for engaging a bearing pin 97 on the frame of the machine, as best shown in Fig. 5. For clearing away the drillings from the valve bore, compressed air may be directed over the surface of the valve flange and over the end of the drill, which air may be supplied through ducts 98 formed in the clamping block from a reservoir through a conduit 99, the flow of compressed air being time-controlled by operation of an air gun valve 100, which, in turn, is controlled by the movement of a lever 101 controlled by the cam 35.

*Testing station.*—As the dial or star wheel advances another 45° in a counter-clockwise direction, a valve being operated upon is brought to the testing station whereat the valve is tested to ascertain whether the bore therethrough is unobstructed. The means by which this is accomplished consists of a rigid tubular conduit 102, the bottom edge of which is feathered so as to make an hermetic seal with the rubber base of the valve stem when brought into engagement therewith, said conduit at its upper end being connected with a flexible hose 103 having a normally closed check valve 104 intermediate its ends, said conduit leading to a source of compressed air. The valve 104 is adapted to be intermittently opened through the action of the bell-crank lever 105, movement of which is controlled by a roller at one end thereof moving over the surface of cam 39. The rigid conduit 102 is movable in a vertical direction into and out of engagement with the valve stem base through the medium of a bell-crank lever 106, one end of which carries a roller movable over the cam 38, and the other end of which carries a forked rocker member 107 the free ends of which engage between a pair of flanges 108 formed on a block 109 rigidly connected to the conduit 102. The block 109 has a passage leading directly therethrough establishing communication between the conduit 102 and the flexible hose 103, and has a lateral passage connecting with the first-mentioned passage establishing communication with a signal switch unit 110. This unit is shown in sectional detail in Fig. 6 and consists of a sleeve 111, one end of which is formed with an externally screw-threaded nipple which engages within the signal block 109, and the other end of which is internally screw-threaded and accommodates an adjusting screw 112. Intermediate its ends the sleeve 111 is formed with diametrically opposed slots 113 into which extend the arms of a contact bar 114 mounted on a plunger rod 115 which extends through an axial opening through the adjusting screw, the said plunger rod having at its inner end a packed plunger or piston 116. The plunger is normally held at its innermost position, as shown in Fig. 6, by a coil spring 117. Enclosing the sleeve 111 and connected thereto is a fibre housing 118 provided with electrical contact elements 119 at diametrically opposed points, from which lead conductors 120 to a suitable source of electrical energy, such as batteries 121 and to a signal device, such as bell 122, the batteries and bell being shown in Fig. 4.

When the conduit 102 is brought into contact with the base of the rubber valve stem and the valve 104 opens so that air under pressure may pass through the valve to determine whether the bore thereof is free of obstruction, any obstruction in said bore will cause a back pressure to build up in the conduit which will react against the piston 116 in the signal switch to move the contact bar 114 into contact with the points 119 to close the electric circuit and ring the bell 122, thereby apprising the operator that the valve under test does not freely pass air.

*Discharge station.*—After the testing operation, as the dial is advanced another 90° in a counter-clockwise direction, a valve being operated upon is brought to the discharge station whereat suction means are brought into contact with the base of the valve to lift said valve from its adapter sleeve and transfer it into a discharge chute 123. The discharge of a valve from the star wheel is accomplished by bringing an ejector pickup nozzle 124 carried by a flexible conduit 125 down over the base of the valve and applying suction thereto whereby it will adhere to the ejector nozzle, which, when raised, will carry the valve with it. The ejector nozzle is illustrated at Fig. 8 of the drawings and consists of a substantially conical shaped member having a nipple end 127 to which the hose 125 is attached. Extending through the nipple is a duct 127', and leading from said duct are a plurality of inclined ducts 128 opening onto the flat base of the nozzle at circumferentially equal spaced points. At its engaging face the nozzle has a peripheral flange 126. The duct 127' through the nipple does not extend axially through the nozzle, but on the contrary terminates short thereof so that direct communication between said duct and the bore of the valve stem will not be had.

For reciprocating the ejector pickup nozzle 124 so as to bring it into and out of relation with a valve carried by the star wheel, the said nozzle is mounted in one end of a pickup arm 129, the other end of which is fixed to one end of a lift rod 130, the opposite end of which seats in a socket member 131 (Fig. 3), which latter is adapted to be reciprocated through the agency of a pair of links 132 pivotally secured to said socket member, the opposite end of said links being connected to one end of a lever 133, the other end of which is pivoted at 134 to the frame of the machine and intermediate its ends it has connected thereto one end of a pair of links 135, the opposite ends of which are connected to one end of a bell-crank lever 136, the opposite end of which carries a roller which moves over the cam 42. In addition to the ejector pickup nozzle having a vertical reciprocatory movement, it also has an oscillatory movement so as to move the withdrawn valve stem from a position directly over the dial to a point directly over the chute 123 laterally disposed with relation to the dial. To accomplish this oscillatory movement the lift rod 130 extends through a plate 137 to which it is keyed so as to be rotatable therewith about its axis, said plate 137 being mounted on a rotor gear sleeve 138 which is fitted over an ejector sleeve 139 mounted on the table 10, the rotor gear sleeve 138 at its lower end being formed or provided with a gear 140. In mesh with said gear 140 is a gear segment 141 carried at one end of a bell-crank lever 142, the opposite end of said lever having a roller which engages over the cam 41. Suction or vacuum is applied to the ejector nozzle through the conduit 125 which is connected to a source of fluid suction which is intermittently interrupted so that when the ejector nozzle supporting a valve stem which has been withdrawn from the dial is brought into overlying relation to the discharge chute 123, the source of fluid suction is cut off, whereupon the valve will drop into said chute. For controlling the fluid suction through the conduit 125 there is disposed intermediate its end a valve 143 which is controlled by a pivoted lever 144, one end of which carries a roller trained over the cam 40.

The sequence of operations at the discharge station is accordingly as follows: The nozzle 124 is brought down in contact with the base of the valve stem, the valve 143 is opened to the source of fluid suction, the nozzle and the valve stem are then withdrawn by raising of the lift rod 130 by movement of the roller on lever 136 over cam 42, and when the valve has cleared the star wheel the rotor gear rotates the lift rod about its axis so as to move the free end of the pickup arm over the chute by the engagement of the roller on lever 142 over cam 41, whereupon, when the valve stem is brought into said position the suction control valve 143 is closed, thereby causing the valve stem to drop into the chute. The various ejector parts are then returned to their initial positions, during which interim the star wheel advances another valve stem to the discharge station for a repetition of the procedure just outlined.

Although the operation of the machine should be apparent from the preceding detailed description, a brief statement of the sequence of operations of the machine will now be given.

*Operation.*—The star wheel is rotated about its axis in a step by step or intermittent movement, during which the operator at the front of the machine will manually insert a valve stem to be finished into each of the sockets. During this intermittent motion, that is, at the dwell of said motion, the various mechanisms at the different stations each simultaneously function. At the trimming station the clamping bit 72 will be brought down into contact with the valve stem and rotated, whereby the excess material will be trimmed off upon coming in contact with the continuously rotating cutter blades, and the clamping bit will be withdrawn from the valve stem. At the drilling station the valve will be clamped, the drill will be brought down to clear the bore, and withdrawn. At the testing station the conduit will be brought into contact with the valve stem, and air under pressure blown therethrough and withdrawn; and at the discharge station a valve will be engaged by the ejector nozzle, withdrawn from the socket, angularly moved, and dropped into the chute.

These specific instrumentalities disclosed herein, it is to be understood, are only shown by way of example and are not to be construed as limitations upon the invention, since other instrumentalities in the same or modified combinations may be substituted for those herein disclosed without departing from the spirit of the invention.

What I claim is:

1. A machine of the character described, comprising a conveyor for carrying valve members having an enlarged rubber base, said conveyor having sockets therein for receiving and supporting such valves in spaced relation and being intermittently movable to successively present such valves at a station with the bottom of the flange facing outwardly, and discharge means at said station comprising a reciprocably movable member having means adapted to engage and withdraw a valve from a socket.

2. A machine of the character described, comprising a conveyor for carrying valve members having an enlarged rubber base, said conveyor having sockets therein for receiving and supporting such valves in spaced relation and being intermittently movable to successively present such valve at a station with the bottom of the flange facing outwardly, and discharge means at said station comprising a reciprocably movable member having a suction head adapted to engage and withdraw a valve from a socket, and means for controlling the suction action whereby the withdrawn valve may be dropped from the suction head.

3. A machine of the character described, comprising a conveyor for carrying valve members having an enlarged rubber base, said conveyor having sockets therein for receiving and supporting such valves in spaced relation and being intermittently movable to successively present such valves at a station with the bottom of the flange facing outwardly, and discharge means at said station comprising a member which is reciprocable and oscillatable, said member having a suction head adapted to engage and withdraw a valve from a socket and then move it out of its path of reciprocable movement.

4. A machine of the character described, comprising a conveyor having a plurality of spaced recesses for receiving a valve member having an enlarged base flange of rubber, said conveyor being intermittently movable to present the recesses successively to spaced apart stations whereat the following mechanisms are operable substantially simultaneously during the period of dwell of the conveyor, means for rotating a valve in a socket and trimming the edge of said flange, means for clamping a valve in a socket and drilling the bore through said flange, and means for testing the bore for clearance and for indicating any obstruction therein.

5. A machine of the character described, comprising a conveyor having a plurality of spaced recesses therein, a socket member mounted for rotation in each recess, and latching means for removably holding a socket member in rotatable relation in a recess.

6. A machine of the character described, comprising a conveyor having a plurality of spaced recesses therein, a spring latch extending into each recess adjacent the peripheral wall thereof and a socket member mounted for rotation in each recess, said socket member having an annular groove therein into which the spring latch extends.

7. A machine of the character described, comprising a conveyor having a plurality of spaced recesses therein, a socket member for supporting a valve member having an enlarged rubber base flange mounted for rotation in each recess, said conveyor being intermittently movable to present a socket member to a station and means at said station operable in timed relation to the period of dwell of the socket member at said station for engaging the base flange of the valve member and rotating it together with the socket member in which it is mounted about the axis of the socket member.

8. A machine of the character described, comprising a conveyor having a plurality of spaced recesses therein, a socket member for supporting a valve member having an enlarged rubber base flange mounted for rotation in each recess, said conveyor being intermittently movable to present a socket member to a station and means at said station operable in timed relation to the period of dwell of the socket member at said station for engaging the base flange of the valve member and rotating it together with the socket member in which it is mounted about the axis of the socket member, and cutting means at said station for peripherally trimming the rubber flange as it is rotated about its axis.

9. A machine of the character described, comprising a conveyor having a plurality of spaced recesses therein, a socket member for supporting a valve member having an enlarged rubber base flange mounted for rotation in each recess, said conveyor being intermittently movable to present a socket member to a station and means at said station operable in timed relation to the period of dwell of the socket member at said station for engaging and clamping the base flange of the valve member to hold it stationary and drill means at said station coaxial with the bore of the valve presented thereat operable in timed relation to the period of dwell of the socket member at said station.

10. A machine of the character described, comprising a conveyor having a plurality of spaced recesses therein, a socket member for supporting a valve member having an enlarged rubber base flange mounted for rotation in each recess, said conveyor being intermittently movable to present a socket member to a station and means at said station operable in timed relation to the period of dwell of the socket member at said station for testing the bore in the valve stem for clearance and for indicating any obstruction in said bore.

PHILIP MICHEL.